US006842246B2

(12) United States Patent
Roufas et al.

(10) Patent No.: US 6,842,246 B2
(45) Date of Patent: Jan. 11, 2005

(54) SIX DEGREE OF FREEDOM POSITION RANGING

(75) Inventors: Kimon D. Roufas, Mountain View, CA (US); Ying Zhang, Cupertino, CA (US); David G. Duff, Woodside, CA (US); Mark H. Yim, Palo Alto, CA (US); Craig Eldershaw, Tarragindi (AU)

(73) Assignee: Xerox Corporation, Stamford, CT (US)

( * ) Notice: Subject to any disclaimer, the term of this patent is extended or adjusted under 35 U.S.C. 154(b) by 219 days.

(21) Appl. No.: 10/016,427

(22) Filed: Dec. 10, 2001

(65) Prior Publication Data

US 2003/0107737 A1 Jun. 12, 2003

(51) Int. Cl.[7] .......................... G01B 11/00; G06F 19/00
(52) U.S. Cl. ...................... 356/399; 700/245; 700/100; 356/400
(58) Field of Search ................................ 356/399, 400, 356/138; 700/245, 176, 100, 248–251, 262; 703/1, 2, 6; 701/23

(56) References Cited

U.S. PATENT DOCUMENTS 6,243,622 B1 * 6/2001 Yim et al. .................. 700/245
6,477,444 B1 * 11/2002 Bennett et al. ............. 700/245
6,636,781 B1 * 10/2003 Shen et al. ................. 700/248

OTHER PUBLICATIONS

K. Roufas, Y. Zhang, D. Duff, M. Yim "Six Degree of Freedom Sensing for Docking Using IR LED Emitters and Receivers" Experimental Robotics VII, Lecture Notes in Control and Information Sciences 271, D. Rus and S. Singh Eds. Springer, Jan. 2001.*

Y. Zhang, et al., *Sensor Computations in Modular Self Reconfigurable Robots*; B. Siciliano and P. Dario (Eds.): Experimental Robotics VIII, STAR 5, pp. 276–286, 2003 © Springer–Verlag Berlin Heidelberg 2003.

M. Yim, et al., *PolyBot: a Modular Reconfigurable Robot*; Proceedings of the 2000 IEEE International Conference on Robotics & Automation, San Francisco, CA, Apr. 2000, pp. 514–520.

* cited by examiner

Primary Examiner—Layla Lauchman
(74) Attorney, Agent, or Firm—Fay, Sharpe, Fagan, Minnich & McKee, LLP (57) ABSTRACT

An alignment system includes a first module having a plurality of emitters and a first receiver configuration located on the face of the first module. A second module has a second plurality of emitters and a second receiver configuration located on the face of the second module. First and second trigger signal generators fire the first and second plurality of the emitters. The generated signals are sensed by at least some of the receivers. A converter arrangement obtain and convert the received signals into digital data representative of the readings received by selected receivers. A processing system computes at least one of an absolute six degree offset or a relative six degree offset between the faces. The offset information is then used to achieve a desired alignment between the face of the first module and the face of the second module.

20 Claims, 7 Drawing Sheets

SIX DEGREE OF FREEDOM POSITION RANGING

GOVERNMENT CONTRACT

This application was developed under U.S. Contract MDA972-98-C-0009 in conjunction with DARPA. Therefore, the U.S. Government may have certain rights to the assignment of this application or any patent issuing therefrom.

BACKGROUND OF THE INVENTION

Embodiments of the present invention are directed to position sensing and movement between components, and more particularly to the alignment and/or docking between these components.

The ability to determine a relative relationship between distinct components has considerable uses. For example, offset sensing between two plates is of value for automatic active docking of self-configurable robot systems. One such system is known as a PolyBot (a robotic system of Xerox Corporation), which uses repeated modules with identical docking mechanisms or interface plates.

In the past, expensive optics and cameras have been used for docking of kinematic chains and robotic arms. One such system is a virtual reality (VR) hardware system, which uses six degree of freedom trackers. Such systems include linkage-based concepts, electro-magnetic fuel based systems, ultrasonic rangings, and inertial tracking methods, among others. The ultrasonic and inertial tracking methods have not been extended to six degree of freedom (DOF) in a robust fashion. The vision based methods tend to be computationally intensive and expensive. The electromagnetic based methods are the most popular for VR. However, they do not work well for self-configurable systems since they are prone to interference of metallic objects and are expensive to implement.

Other non-light based positional methods include eddy-current sensing, hall effect sensors or capacitance based methods. Drawbacks of these methods are the intimate presence of electric motors, which may cause too much noise to make the sensing feasible.

SUMMARY OF THE INVENTION

An alignment system includes a first module wherein a plurality of emitters are located at defined locations on the face of the first module. The emitters are positioned to emit signals of a known intensity distribution away from the face of the first module. A first receiver configuration is also located on the face of the first module, where the first receiver configuration has a known sensitivity distribution. A second module has a second plurality of emitters located at defined locations on the face of the module. The second plurality of emitters are positioned to emit signals of a known intensity distribution away from the face of the second module. A second receiver configuration is also located on the face of the second module, and has a known sensitivity distribution. First and second trigger signal generators are configured to fire the first and second plurality of emitters, respectively, in predetermined patterns. The generated signals are sensed by at least some of the receivers comprising the first and second receiver configurations. A converter arrangement is operationally connected to the first and second receiver configurations in order to obtain and convert the received signals into data representative of the readings received by selected receivers. A processing system is in operational connection to the first converter and the second converter, and computes at least one of an absolute six degree offset or a relative six degree offset between the faces. The offset information is then used to achieve a desired alignment between the face of the first module and the face of the second module. The operational connection of the components for the system may be accomplished via both physical wire type connections as well as through wireless connections.

BRIEF DESCRIPTION OF THE DRAWINGS

The invention may take form in certain parts and in certain steps and arrangements of parts and steps, the preferred embodiments of which will be described in detail in this specification and illustrated in the accompanying drawings, which form a part herein and wherein.

DETAILED DESCRIPTION OF PREFERRED EMBODIMENTS

1. Introduction

Figure 1:
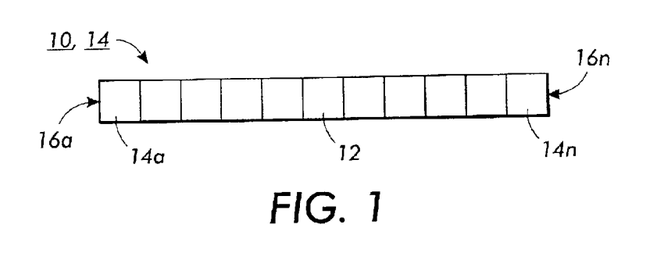
FIG. 1 is an illustration of a multi-modular robot system, in a linear configuration which may implement embodiments of the present invention.

A simplified view of a modular, self-configurable robot 10 which may implement concepts described herein is illustrated in FIG. 1. Modular robot 10 is an automatically reconfiguring, hardware system that tends to be more homogenous than heterogeneous. Particularly, the system may have different types of modules, but the ratio of the number of module types to the total number of modules is low. Systems with these characteristics are called n-modular where n refers to the number of module types and n is typically 1 or 2. In this example, there may be a main or node module 12, and secondary or segment modules 14 and including modules 14a and 14n are substantially identical in design.

In one embodiment, each module of modular robot 10 may include an embedded processor such as a Motorola PowerPC 555 processor, having sufficient memory such as 1 megabyte of external RAM. The modules communicate over a semi-global bus using, for example, a controller area network (CANbus) standard.

Figure 2:
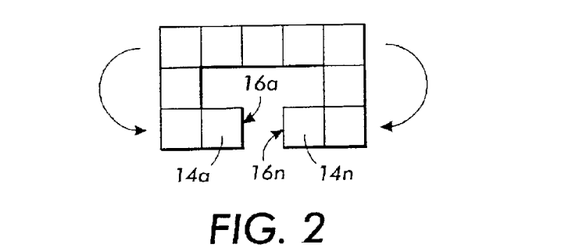
FIG. 2 is the modular robot of FIG. 1 shown in a different configuration.

Modular reconfigurable robots with multiple modules have the ability to form a variety of shapes with a large number of degrees or dimensions of movement. The robot may change its shape to suit different tasks. For example, robot 10 shown in FIG. 1 may move to connect its end modules 14a, 14n into a docked arrangement. Modular robot 10 can repositioned itself into a substantially different topological design like a loop. However, in order to complete this positioning, it is necessary for face plates 16a and 16n of the corresponding modules 14a and 14n to enter into an aligned position as shown in FIG. 2 which will permit complete docking and connection between modules 14a and 14n. Complete docking may also include the modules having mechanical and electrical module connectors.

Due to various factors, including mechanical friction open loop errors exist which lower the accuracy of the alignment. This accuracy of alignment is a significant problem in such docking environments. Therefore, the following discussion will focus on an alignment system which improves the accuracy of alignment for docking of the robotic modules described. However, it is to be appreciated such an alignment system will have other uses in fields different from robotics.

2. Introduction to a First Face Plate Embodiment

Figure 3:
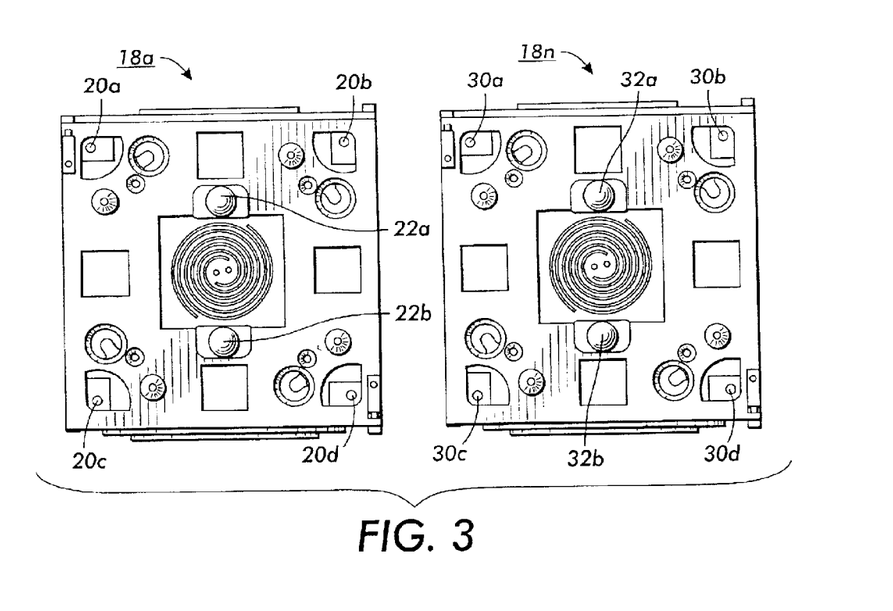
FIG. 3 illustrates face plates of modules illustrated in FIG. 2.

Illustrated in FIG. 3 is a first embodiment of face plates 18a, 18n which may be used for the face plates 16a, 16n of FIGS. 1 and 2.

One embodiment of the six degrees or dimensions of freedom position ranging system of the present invention implements commercial-off-the-shelf (COTS) infrared (IR) light emitting diode (LED) emitters and COTS IR receivers, on face plates 18a, 18n. The intensity distribution of the emitters and the sensitivity distribution of the receivers allow for estimation of the angle and distance between an opposing plate. The designs and operation of the present system, as confirmed by experiments, indicate that such a design is capable of providing positional offset information in any of six degrees of error (x, y, z, pitch, roll, and yaw) within a prescribed range.

The commercial off-the-shelf IR LED emitters and IR receivers were chosen for the system for their low cost, small size minimal interface requirements and low processing overhead. However, specialized emitters and receivers using infrared or other signal transmission and/or reception medians, may also be used in the system for specific implementations.

Returning to FIG. 3, opposing plates 18a and 18n are identically configured. Four IR LEDs emitters 20a–20d are configured in the corners of face plate 18a. Additionally two IR receivers 22a, 22b are located at the midpoint (or mid-line) and substantially near center on face plate 18a. Face plate 18n includes identically positioned LEDs 30a–30d and IR receivers 32a, 32b, positioned at substantially identical locations as those on face plate 18a. It is to be appreciated, the sensing method and alignment capabilities described below may extend to systems which have mechanical and/or electrical connection mechanisms, as well as systems where components do not come into physical contact but rather are simply aligned.

In one embodiment, each of the eight emitters 20a–20d and 30a–30d is lit in sequence and an analog reading is taken by receivers 22a, 22b and 32a, 32b. The intensity distribution of an emitter and the sensitivity of a receiver permits obtaining six degree offset between two opposing plates. Experiments have been conducted which provide positional offset in any of six degrees of error (x, y, z, pitch, roll, and yaw) within a prescribed range, while the following discussion focuses on a system which provides positional offset information related to six degrees of error, it is to be understood the concepts may also be applied to systems having more or less degrees of movement.

The design ensures that each receiver detects and samples the intensity from each emitter on the opposite plate at a distinct time. In order to accomplish this, each of the emitters is lit in sequence and a reading is taken from the opposing receivers. Readings are also taken in between the times when the IR LED emitters are active in order to measure the ambient IR.

Figure 4:
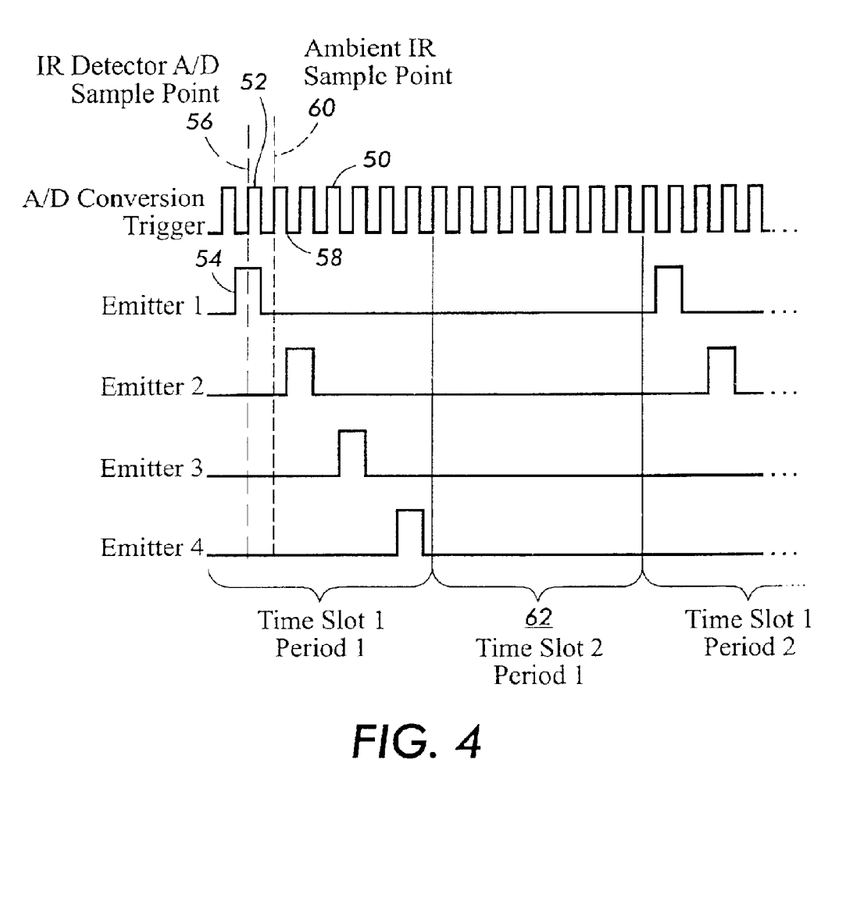
FIG. 4 sets forth an emitting and receiving signal sequence pattern for operation of one embodiment of the present invention.

FIG. 4 depicts control signals for one embodiment of the operation of the system in accordance with the face plates of FIG. 3. Particularly, shown are the control signals for the first four emitters to be lit. The system may be programmed to select a first plate to emit signals during "Time slot 1." The two plates are synchronized so that receivers on the plate measure at the correct time. At the end of a time period, each of the receivers (assuming four total receivers, two on each plate) will have four readings from their opposing emitters, and four ambient readings totaling 32 measurements. The ambient IR readings are subtracted from the sample in order to improve the robustness of the system. Thus, following this subtraction step, the system will end up with 16 pieces of data.

With continuing attention to FIG. 4, a triggering or clock signal 50 generated by trigger signal generators permit the synchronization and operation of the data acquisition and sampling sequences. Upon the start of second clock cycle 52, emitter 1 becomes active 54. At this time, IR receivers on the plates (the first emitters through fourth emitters are sample designations and may be representative of any of the emitters previously described) 56 detect the output of emitter 1. As shown on the next clock signal 58, detection at the ambient IR sample point 60 is undertaken. The foregoing process is continued for each of the emitters (emitters 2–4) on the first face plate. Thereafter in a second time slot of the first period 62 activation and detection of the emitters on a second face plate are undertaken. It is to be appreciated while this embodiment discloses a particular number of emitters and receivers at specific locations, the concepts of the application may be accomplished using other numbers and locations for the components.

3. IR Intensity Model Design of the First Embodiment

The concept behind the present system design is based on an idea that the intensity detected by a receiver is a function of the distance and/or angle between the emitter and receiver, i.e., I=f(e, r, d) where I is the intensity reading, e and r are emitter and receiver angles, respectively, and d is the distance between the emitter and the receiver. A model can then be obtained by model fitting for given emitters and detectors.

Figure 5A:
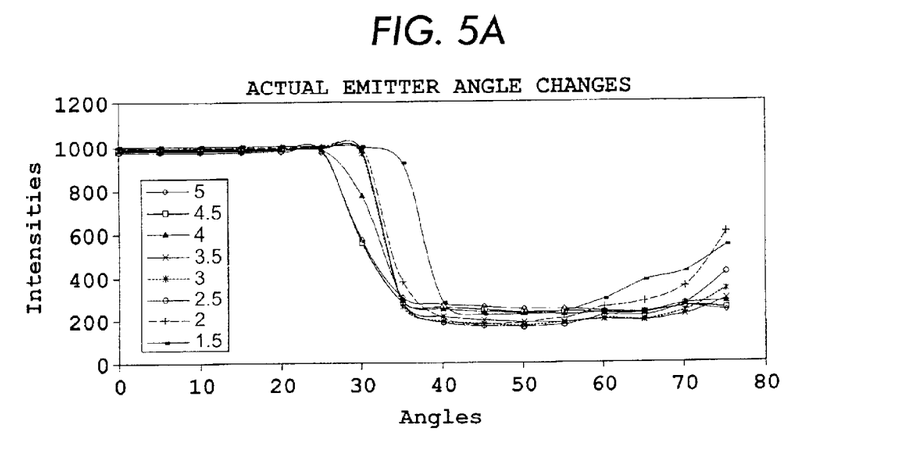
FIGS. 5a and 5b set forth actual intensity changes at emitter and receiver angles and at various distances between the emitter and the receiver.
Figure 5B:
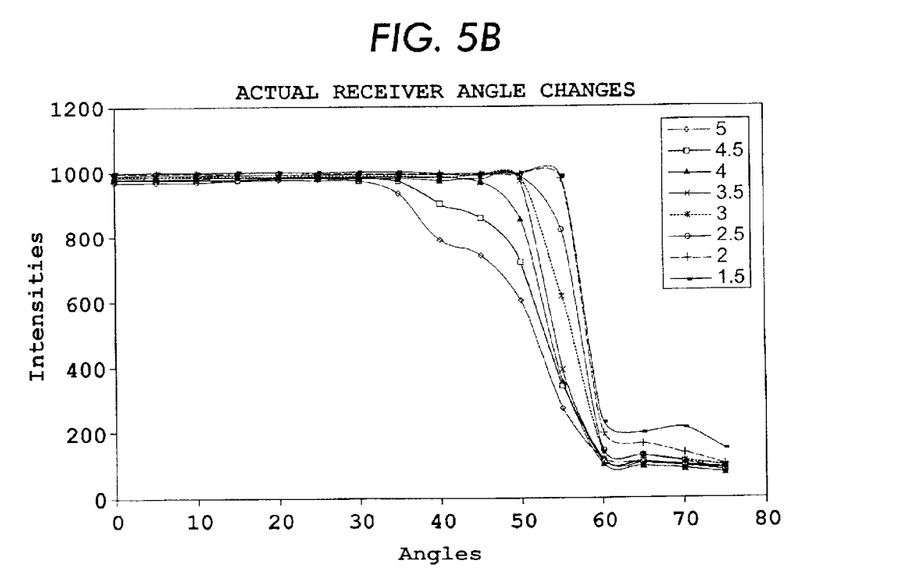

The model of this embodiment was constructed by decomposing $f$ into three functions, $f_e(e)$, $f_r(r)$, $f_d(d)$ and by letting $I=Af_e(e)f_r(r)f_d(d)$ where A is a scale factor. Two separate data collections were undertaken, one fixed r to 0 degrees and changed e from 0° to 90° in 5 degree increments, and d was moved from 0.5 inches to 5 inches in 0.5 inch increments. The other data collection fixed e to 0 and changed r from 0° to 90° in 5 degree increments, and d from 0.5 to 5 inches. The results of this data collection are plotted in FIGS. 5a and 5b, respectively. FIGS. 5a and 5b therefore show actual emitter angle changes where the angles are plotted against intensity at various distances.

The following function:

$$f_e = (A-O)e^{-(\theta_e - \theta_{e0})^2/\sigma_e^2} + O$$

where A is 1000, O is 150 and $\theta_e^0$ is 20 degrees, is used to fit the data in a least squares fashion, and obtain the parameter $\sigma_e$ as 0.2660. Similarly, function:

$$f_r = (A-O)e^{-(\theta_r - \theta_r 0)^4/\sigma_r 4} + O$$

with $\theta_r^0$ as 40 degrees is used to fit the receiver data, and obtain the parameter $\sigma_r$ as 0.3694. As a result, the IR intensity model is obtained:

$$I = (A-O)e^{-(\theta_e - \theta_e 0)^2/\alpha_e 4}e^{-(\theta_r - \theta_r 0)^2/\sigma_r 4} + O.$$

Figure 6A:
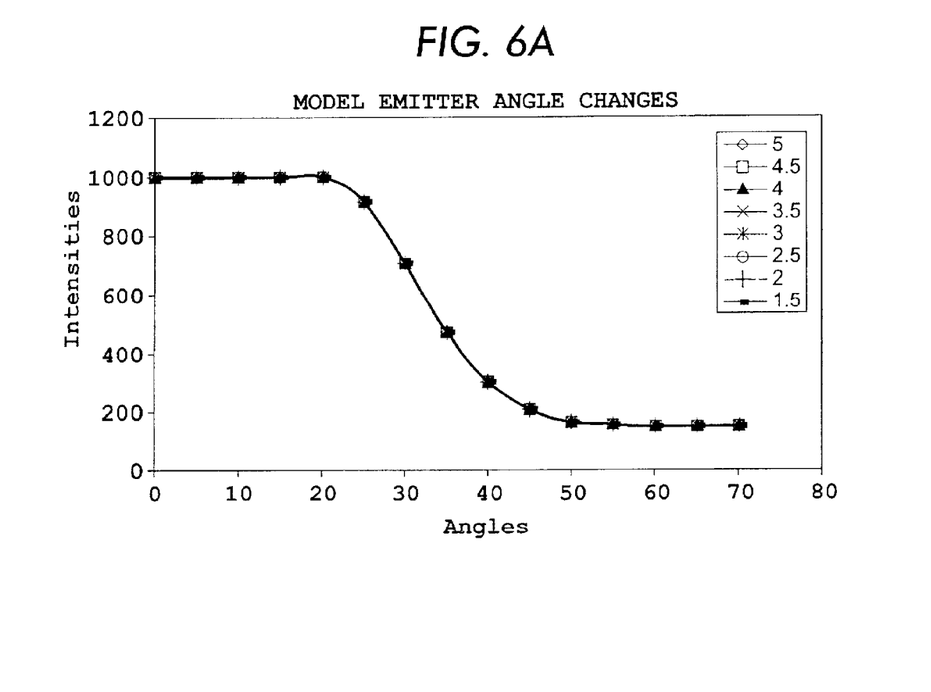
FIGS. 6a and 6b depict intensity changes of the emitter and receiver angles at various distances between them computed by a model.
Figure 6B:
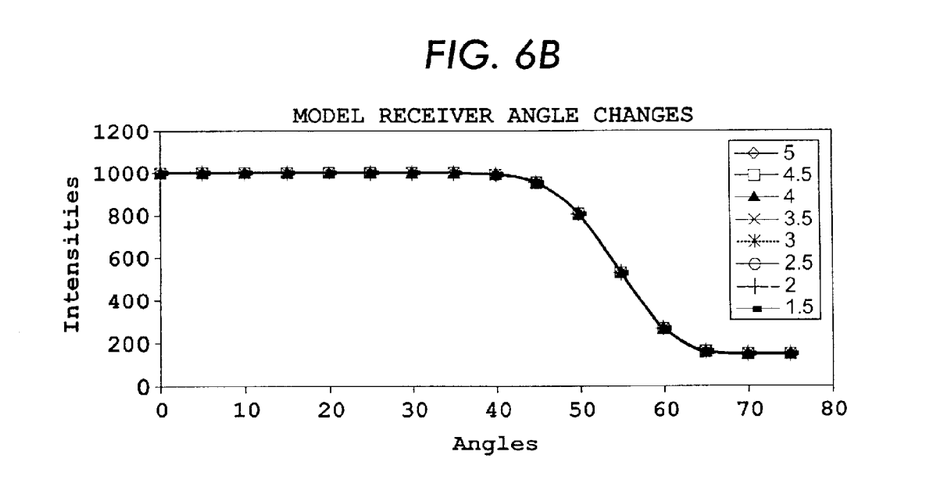

Using this model, the corresponding model data is plotted in FIGS. 6a and 6b. Compared with FIGS. 5a and 5b, the model fits the data relatively well.

4. Six Dimensional Offset Estimation Methods for the First Embodiment

Figure 7:
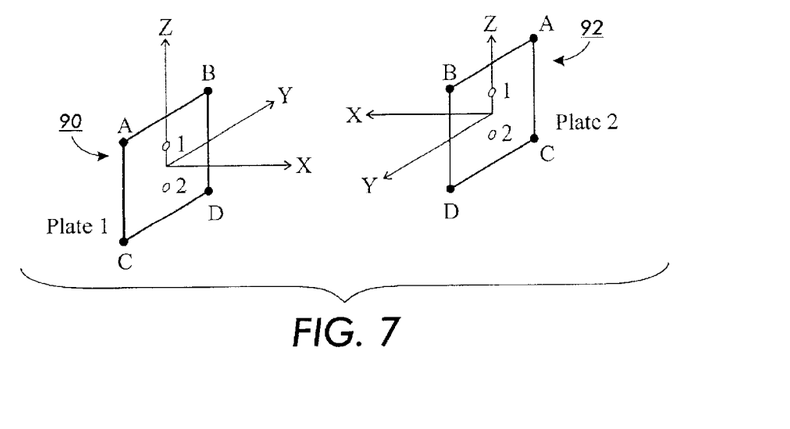
FIG. 7 depicts a first and second plate and sensor arrangement in a first embodiment.

For each plate, attached is a frame as shown in FIG. 7 (in this case Plate1 (90) and Plate2 (92) are facing each other). Given an offset between the two plates, the spatial relationship between each emitter and receiver pair is determined.

In this description d is the distance from the receiver to the center of the plate, and w and h are the width and height of the position of the emitters. The coordinate of receiver 1 in its own frame is <0, 0, d>, and the coordinate of the receiver 2 is <0, 0, −d>; similarly, the coordinates of emitters A, B, C and D are <0, −w, h>, <0, w, h>, <0, −w, −h> and <0, w, −h>, respectively. The offset of the frame of plate 2 is <x, y, z, $\alpha$, $\beta$, $\gamma$>, with respect to the frame of plate 1 (in the case of two plates facing each other, the offset is <x, 0, 0, $\pi$, 0, 0>), T is the transform matrix from plate 1, 90, to plate 2, 92, obtained by the offset, and R is the rotation matrix of T. The norm of plate 1 is, <1, 0, 0> and the norm of the plate 2 in plate 1 coordinates is R<1, 0, 0>. Then $<x_e, y_e, z_e>$ is made the coordinate of the emitter in its own frame and $<x_r, y_r, z_r>$ is made the coordinate of the receiver of the opposing plate in its own frame. Under this scenario there are two cases:

(i) The emitter is on plate 1 and the receiver is on plate 2: the position of the emitter is $o = <x_e, y_e, z_e>$ and the position of the receiver is $q = Tp$ where $p = <x_r, y_r, z_r>$ and $q = <x_r, y_r, z_r>$.
(ii) The emitter is on plate 2 and the receiver is on plate 1: the position of the receiver is $o = x_r, y_r, z_r>$, and the position of the emitter is $q = Tp$ where $p = <x_e, y_e, z_e>$ and $q = <x_e, y_e, z_e>$ Given two points in space, o and q, and the norms of their plates, $n_o$ and $n_q$, the distance between them is $|q-o|$, the angle at o is $\arccos(n_o \cdot (q-o)/|q-o|)$ and the angle at q is $\arccos(n_q \cdot (q-o))/|q-o|$. Therefore, the emitter and receiver angles as well as the distance between the receiver and the emitter can be obtained for each of the 16 pairs of emitters and receivers. Given the IR intensity model obtained in the previous section, a model from each six DOF offset between two plates to 16 readings of intensities is defined as:

$$I_i = f_i(x, y, z, \alpha, \beta, \gamma) \text{ for } I=1 \text{ to } 16.$$

4.1. Absolute Six DOF Position Sensing

Theoretically, the problem of six DOF offset estimation is a problem of data fitting, i.e., solving <x, y, z, $\alpha$, $\beta$, $\gamma$> given sixteen data readings. In particular, letting $R_i$, i=1 . . . 16, by the sixteen readings and letting E be an energy function to be minimized, then:

$$E = \frac{1}{2} \sum_1^{16} (R_i - f_i(x, y, z, \alpha, \beta, \gamma))^2,$$

which transforms to six equations:

$$\frac{\partial E}{\partial p} = \sum_1^{16} \left( R_i - f_i(x, y, z, \alpha, \beta, \gamma) \right) \frac{\partial f_i}{\partial p} = 0,$$

where p is x, y, z, $\alpha$, $\beta$ and $\gamma$.

This set of equations can then be solved using Newton's method. In this embodiment Singular Value Decomposition (SVD) was used for solving linear equations at each Newton step. The use of SVD greatly reduces the risk of reaching a singularity that is common in problems involving the inverse of matrices. It also achieves an improved result in both under-constrained (minimum change) and over-constrained (minimum error) situations.

4.2. Relative Six DOF Offset Sensing

In the close loop control of the docking process, it is not necessary to have absolute six DOF position sensing, as long as the system (1) is able to tell the direction of the offset and (2) is able to tell the offset between the plates is small enough to be within a working range. The first requirement (1) is used to guide the motion of the plates, and the second requirement (2) is used to trigger the mechanical connections to operate at the right time.

A centering method has been developed based on the idea of signal "balancing" when the plates are centered and facing each other (see FIG. 7). Let Xij represent a reading where X is the emitter ID (A, B, C, or D), i is the receiver ID (1 or 2) and j is the plate ID (1 or 2) and let$_{13}$ represent the case that holds for both plate 1 and 2. When two plates are centered and facing each other, a set of equations are developed:

A1__=B1__, A2__=B2__, C1__=D1__, C2__=D2$_{13}$.

In practice, even when the two plates are exactly centered, the equations may not hold because of noise and slight variations when mechanically assembling the plates. The difference, however, can be used as a guideline for a relative offset. For example, (A1__−B1__)+(A2__−B2__)+(C1__−D1__)+(C2__−D2__) gives offset in the Y direction, while (A1__−C2__)+(A2__−C1__)+(B1__−D2__)+(B2__−D1__) gives relative offset in the Z direction. This method has been used to successfully dock two plates in a plane, i.e., a special case with three DOF offset.

To follow this path further, we discovered five "balancing" equations, each of which corresponds to an invariant with respect to all but one variable of the six DOF offset:

1. Y variant (x, z, $\alpha$, $\beta$, $\gamma$ invariant): B12+D22+B11+D21= A12+C22+A11+C21, B22+D12+B21+D11=A22+C12+ A21+C11.
2. Z variant (x, y, $\alpha$, $\beta$, $\gamma$ invariant): A12+B12+D21+C21= C22+D22+B11+A11, A22+B22+D11+C11=C12+D12+ B21+A21.
3. $\alpha$ variant (x, y, z, $\beta$, $\gamma$ invariant): B12+A11+D22+C21= A12+B11+C22+D21, D12+C11+B22+A21=C12+D11+ A22+B21.
4. $\beta$ variant (x, y, z, $\alpha$, $\gamma$ invariant): A12+B11+B12+A11= C22+D21+D22+C21, A22+B21+B22+A21=C12+D11+ D12+C11.
5. $\gamma$ variant (x, y, z, $\alpha$, $\beta$ invariant): B12+C22+B11+C21= A12+D22+A11+D21, A22+D12+A21+D11=B22+C12+ B21+C11.

A minimization method was then developed which can be used for any of the equations. For example, for equation A=B, an energy function is defined as:

$$E = \frac{1}{2}(A-B)^2.$$

Note that this energy function does not have the explicit IR model as the one used for the absolute position sensing. The goal of centering is to move to the direction where the energy function can be minimized. In order to minimize E, we calculate:

$$\frac{\partial E}{\partial p} = (A-B)\left(\frac{\partial A}{\partial p} - \frac{\partial B}{\partial p}\right), \frac{\partial^2 E}{\partial^2 p} \approx \left(\frac{\partial A}{\partial p} - \frac{\partial B}{\partial p}\right)^2,$$

By letting $$\Delta p = -\frac{\partial E}{\partial p} \bigg/ \frac{\partial^2 E}{\partial^2 p},$$

obtained is the direction of the offset movement to minimize the energy function defined by the equation. Because each equation corresponds to exactly one variant, that equation is used to calculate the offset of that variant, i.e., equation 1 to calculate y, equation 2 to calculate z, equation 3 to calculate α, equation 4 to calculate β and equation 5 to calculate γ. To calculate x, we use energy function $$E = \frac{1}{2}\sum X_{ij}^2,$$

based on the fact that all the readings go to zero when x approaches 0 in centered position. For simplicity, assuming the plates are centered, we have $$\Delta x = -\frac{\partial E}{\partial x} \bigg/ \frac{\partial^2 E}{\partial^2 x}, \text{ where}$$

$$\frac{\partial E}{\partial x} = \sum \left(X_{ij}\frac{\partial X_{ij}}{\partial x}\right) \text{ and } \frac{\partial^2 E}{\partial^2 x} \approx \sum \left(\frac{\partial X_{ij}}{\partial x}\right)^2.$$

It is to be understood that the relative method relies on the symmetry in the emitter/receiver positions, while the absolute method does not.

5. Experimental Results for the First Embodiment

An experimental setup for measuring six DOF offset has been developed. The setup includes two PolyBot modules each of which has an IR plate and one module for calculating the offset. The three modules communicate via CANbus and each contains an MPC555. The outputs of the six DOF offset are sent from the computing MPC555 to a CANalyzer, which is a CAN interface program running on a PC. The experiments are done basically by fixing one IR module and moving the other IR module in space.

The solution described was originally intended for use with modular reconfigurable robots. The intent is to provide a simple and easy system that the robot can use to accomplish closed-loop docking of two serial chains of modules. It is assumed that using open-loop control, the robot will achieve the goal of docking with errors in up to six DOF. The absolute method does not work as well as expected, the relative method does successfully dock two plates in demo.

6. Introduction to a Second Face Plate Embodiment

Figure 8:
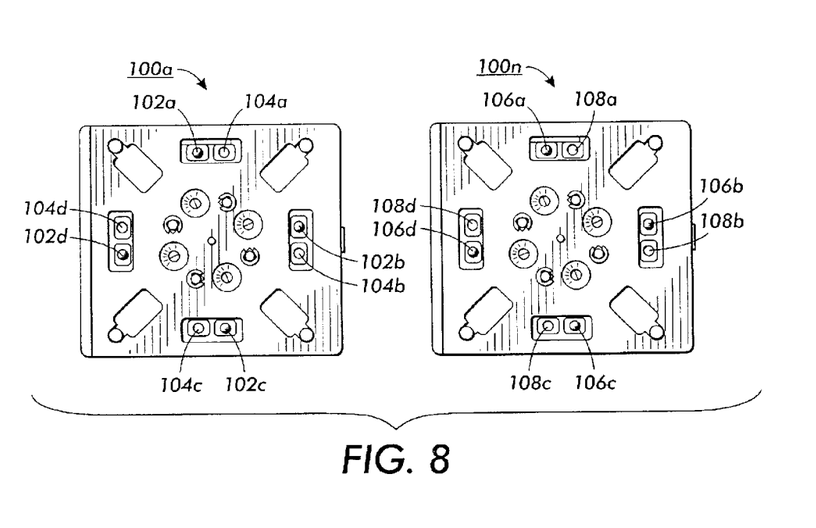
FIG. 8 shows additional embodiments of the face plates which may be used in connection with the modules of FIG. 2.

Turning to FIG. 8, a second embodiment of the connection/face plates 100a, 100n of modules 14a and 14n (FIGS. 1 and 2) are illustrated. In this embodiment, the face plates are designed with emitter/receiver pairs. For example, on face plate 100a, emitter 102a is paired with receiver 104a at an area near the edge of the face plate. Remaining emitters 102b, 102c and 104d are paired with receivers 104b, 104c and 104d, respectively. These emitters and receivers, similar to the discussion in connection with FIG. 3, may also be designed with COTS LEDs and COTS IR receivers or other appropriate devices as mentioned in connection with the first embodiment. With continuing attention to FIG. 8, face plate 100n is configured to be identical to face plate 100a. Therefore emitters 106a, 106b, 106c and 106d are paired in a positional relationship with receivers 108a, 108b, 108c and 108d at positions identical to the position on face plate 100a.

Face plate 100a also has electrical connections and mechanical connections, which are aligned identically with electrical connections and mechanical connections of face plate 100n.

In an operational embodiment of a system implementing face plates 100a and 100n of FIG. 8, each of the 8 emitters are lit in sequence and an analog reading is taken from all four of the opposing receivers on the opposite face plate. The intensity distribution of the emitters and the sensitivity distribution of the receivers permit for an estimation of the angle and distance between these components. This design permits obtaining of positional offset information in any of six degrees of error (x, y, z, pitch, roll and yaw) within a predetermined range. In this embodiment it is not necessary to have the receivers on the face plate emitting signals to also receive those signals.

A theoretical framework is also established for this design using the least squares minimization. The theoretical framework is general and applies to other configurations of emitter and receiver parts and positioning. When the offset between the two plates is out of the range, or when the model of IR emitter-receiver loses the sensitivity, a relative method based purely on the geometry positions of the emitters and receivers can be used.

The design of FIG. 8 has the property that when the two faces are closer, the intensities received by receivers from signals generated by corresponding emitters increase.

As in the previous design, the electrical design ensures that each receiver detects and samples the intensity from each emitter on the opposite plate at a distinct time. However, data only from one module may be used, rather than from both sides in the first embodiment. In order to do that, each of the four emitters is lit in sequence and an analog reading is taken from each of the four opposing receivers. Readings are also taken in between the times when the IR LEDs are emitting to measure the ambient IR. At the end of a time period, each of the receivers will have four readings from their opposing emitters, and four ambient readings totaling 32 measurements. The ambient IR readings are subtracted from the preceding sample to make the system more robust. Following the subtraction, 16 pieces of date are available for use.

7. IR Intensity Model of the Second Face Plate Embodiment

Figure 9:
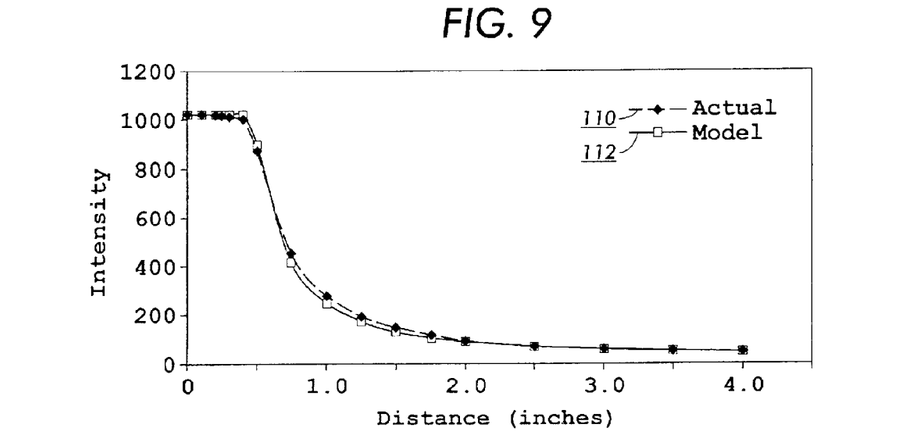
FIG. 9 discloses actual and model intensity curves for the second embodiment.

The theory behind this design is based on the fact that the intensity detected by a receiver is a function of the distance and/or angle between the emitter and receiver, i.e., I=ƒ(e, r, d) where I is the intensity reading, e and r are emitter and receiver angles, respectively, and d is the distance between the emitter and the receiver. An accurate model can be obtained by model fitting for given emitters and detectors. Different from the embodiment of FIG. 3, this implementation uses an IR emitter-receiver pair that is not so sensitive to emitter and receiver angles, but very sensitive to distance, the emitter intensity and the receiver sensitivity are also adjusted so that the distance curve has a wide sensitivity range. Using model $f(d)=A/d^2+O$, O is set to be 35, A is obtained via a least square curve fitting, which is 217. FIG. 9 shows the actual curve 110 and model curve 112 of the IR emitter-receiver pair used for the setting.

8. Six Dimensional Offset Estimation Methods for the Second Embodiment

Figure 10:
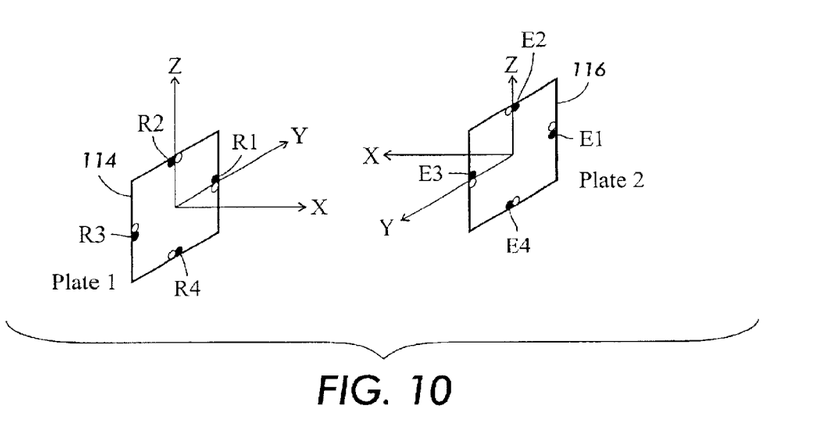
FIG. 10 discloses a first and second plate and sensor arrangement in a second embodiment.

For each face plate, a frame may be attached as shown in FIG. 10 (in this case Plate 1 (114) and Plate 2 (116) are facing each other). Given an offset between the two plates, the spatial relationship between each pair of emitter and receiver is determined.

Letting S be the shorter distance from the emitter or receiver to the center of the plate, and L the longer distance to the center of the plate. The coordinate of four receivers are <0, L, −S>, <0, S, L>, <0, −L, S> and <0, −S, −L>, respectively, and the coordinates of the four emitters are <0, −L, −S>, <0, −S, L>, <0, L, S> and <0, S, −L>, respectively. Let <x, y, z, $\alpha$, $\beta$, $\gamma$> be the offset of the frame of plate 2 with respect to the frame of plate 1 (in the case of two plates facing each other, the offset is <x, 0, 0, $\pi$, 0, 0>) and let T be the transform matrix from plate 1 to plate 2 obtained by the offset, and R be the rotation matrix of T. The norm of plate 1 is <1, 0, 0> and the norm of the plate 2 in plate 1 coordinates is R<1, 0, 0>. Let <$x_r$, $y_r$, $z_r$> be the coordinate of the receiver in its own frame in plate 1 and <$x_e$, $y_e$, $z_e$> be the coordinate of the emitter of plate 2 in its own frame, the position of the receiver is o=<$x_r$, $y_r$, $z_r$>, and the position of the emitter is q=Tp where p=<$x_e$, $y_e$, $z_e$>.

Given two points in space, o and q, and the norms of their plates, $n_o$ and $n_q$, the distance between them is $|q-o|$, the angle at o is $\arccos(n_o \cdot (q-o)/|q-o|)$ and the angle at q is $\arccos(n_q \cdot (o-q)/|q-o|)$. Therefore, the emitter and receiver angles as well as the distance between the receiver and the emitter can be obtained for each of the sixteen pairs of emitters and receivers. Given the IR intensity model we obtained in the previous section, we get a model from each six DOF offset between two plates to 16 readings of intensities, i.e., $I_i = f_i(x, y, z, \alpha, \beta, \gamma)$ for I=1 to 16.

8.1. Absolute Six DOF Position Sensing

Theoretically, the problem of six DOF offset estimation becomes a problem of data fitting, i.e., solving <x, y, z, $\alpha$, $\beta$, $\gamma$> given sixteen data readings. In particular, let $R_i$, i=1 . . . 16, be the sixteen readings and let E be an energy function to be minimized, $$E = \frac{1}{2}\sum_{1}^{16}(R_i - f_i(x, y, z, \alpha, \beta, \gamma))^2$$

which transforms to six equations:

$$\frac{\partial E}{\partial p} = \sum_{1}^{16}(R_i - f_i(x, y, z, \alpha, \beta, \gamma))\frac{\partial f_i}{\partial p} = 0,$$

where p is x, y, z, $\alpha$, $\beta$, and $\gamma$.

This set of equations can then be solved using Newton's method, by using Singular Value Decomposition (SVD) for solving linear equations at each Newton step. The use of SVD greatly reduces the risk of reaching a singularity that is very common in problems involving the inverse of matrices. It also achieves a better result in both under- (minimum change) and over-constrained (minimum error) situations.

8.2. Relative Six DOF Offset Sensing

In close loop control of the docking process, it is not necessary to have absolute six DOF position sensing, as long as (1) it can tell the direction of the offset and (2) it can tell if the offset between the plates are small enough; (1) is used to guide the motion of the plates and (2) is to trigger the latches in the plates to open and close at the right time.

A centering method was therefore developed based on the idea of signal "balancing" when the plates are centered and facing each other. Let Vij represent a reading where i is the emitter ID and j is the receiver ID. When two plates are centered and facing each other, we have a set of equations, e.g., V11=V33, V22=V44. In practice, even when the two plates are exactly centered, the equations may not hold because of noise and slight variations when mechanically assembling the plates. The difference, however, can be used as a guideline for a relative offset. For example, (V32−V12)+(V34−V14)+(V21−V23)+(V41−V43) gives offset in Y direction, while (V43−V23)+(V41−V21)+(V32−V34)+(V12−V14) gives relative offset in Z direction. This method has been used to successfully dock two plates in a plane, i.e., a special case with three DOF offset, even in the previous design.

To follow this path further, five "balancing" equations were developed, each of which corresponds to an invariant with respect to all but one of six DOF offset:

Y Variant (x, z, $\alpha$, $\beta$, $\gamma$ invariant): V32+V21+V34+V41=V23+V12+V43+V14.

Z Variant (x, y, $\alpha$, $\beta$, $\gamma$ invariant): V43+V32+V41+V12=V23+V34+V21+V14.

$\alpha$ Variant (x, y, z, $\beta$, $\gamma$ invariant): V11=V33.

$\beta$ Variant (x, y, z, $\alpha$, $\gamma$ invariant): V22=V44.

$\gamma$ Variant (x, y, z, $\alpha$, $\beta$ invariant): V41+V12+V23+V34=V21+V32+V43+V14.

A minimization method was then developed which can be used for any of the equations. For example, for equation A=B, an energy function is defined as:

$$E = \frac{1}{2}(A - B)^2.$$

Note that this energy function does not have the explicit IR model as the one used for the absolute position sensing. The goal of centering is to move to the direction where the energy function can be minimized. In order to minimize E, we calculate:

$$\frac{\partial E}{\partial p} = (A - B)\left(\frac{\partial A}{\partial p} - \frac{\partial B}{\partial p}\right), \frac{\partial^2 E}{\partial^2 p} \approx \left(\frac{\partial A}{\partial p} - \frac{\partial B}{\partial p}\right)^2,$$

in which, p is y, z, $\alpha$, $\beta$ or $\gamma$.

By letting $\Delta p$ $$\Delta p = -\frac{\partial E}{\partial p} \bigg/ \frac{\partial^2 E}{\partial^2 p},$$

obtained is the direction of the offset movement to minimize the energy function defined by the equation. Because each equation corresponding to exactly one variant, that equation is used to calculate the offset of that variant, i.e., equation 1 to calculate y, equation 2 to calculate z, equation 3 to calculate $\alpha$, equation 4 to calculate $\beta$ and equation 5 to calculate $\gamma$. To calculate x, we use energy function $$E = -\frac{1}{2} \sum_{i=1,2,3,4} V_{ii}^2,$$

based on the fact that all the four readings go to maximum when x approaches 0 in centered position. For simplicity, assuming the plates are centered, we have $$\Delta x = -\frac{\partial E}{\partial x} \bigg/ \frac{\partial^2 E}{\partial^2 x},$$

where $$\frac{\partial E}{\partial x} = -\sum_{i=1,2,3,4} \left( V_{ii} \frac{\partial V_{ii}}{\partial x} \right)$$

and $$\frac{\partial^2 E}{\partial^2 x} \approx -\sum_{i=1,2,3,4} \left( \frac{\partial V_{ii}}{\partial x} \right)^2.$$

In the case where the IR curve is flat (distance close to 0 or larger than a maximum distance the system will work; in one embodiment 5 inches), direct estimation is used, i.e., y=V32+V21+V34+V41−V23+V12+V43+V14, z=V43+V32+V41+V12−V23+V34+V21+V14, α=V11−V33, β=V22−V44, γ=V21+V32+V43+V14−V41+V12+V23+V34.

The threshold to decide the direction depends on the noise level. For x, we can get an estimation by calculating V=(V11+V22+V33+V44)/4 and find the corresponding distance value from the IR model curve.

9. Experimental Results for the Plate Embodiment

Experiments using both absolute and relative position sensing methods of the second embodiment were undertaken. In the current embodiment using an embedded chip, MPC555 with 20 MHz, it took about 2.5 s to obtain an absolute position from an unknown start; it took 0.25 s if the start point is not far from the actual position. The relative method is very efficient, it took less than 1 tick (60 Hz). Relative and absolute position sensing may be used. The relative method is used for two purposes: first, it is a reliable method when the distance is out of range and secondly, it is used as a correctness or bound check for the absolute method, since the numerical algorithm used in the absolute method can go to local minimum from time to time.

This second embodiment illustrates an improved IR curve to reduce the saturation range and extend sensitivity in the unsaturated range, so that six DOF absolute positioning is obtained. The positions of IR emitters and receivers have also been arranged so that the receivers still measure signals when the two plates are docked without loss of sensitivity. Both improvements increase the operation of obtaining the absolute six DOF offset for the second embodiment.

Figure 11:
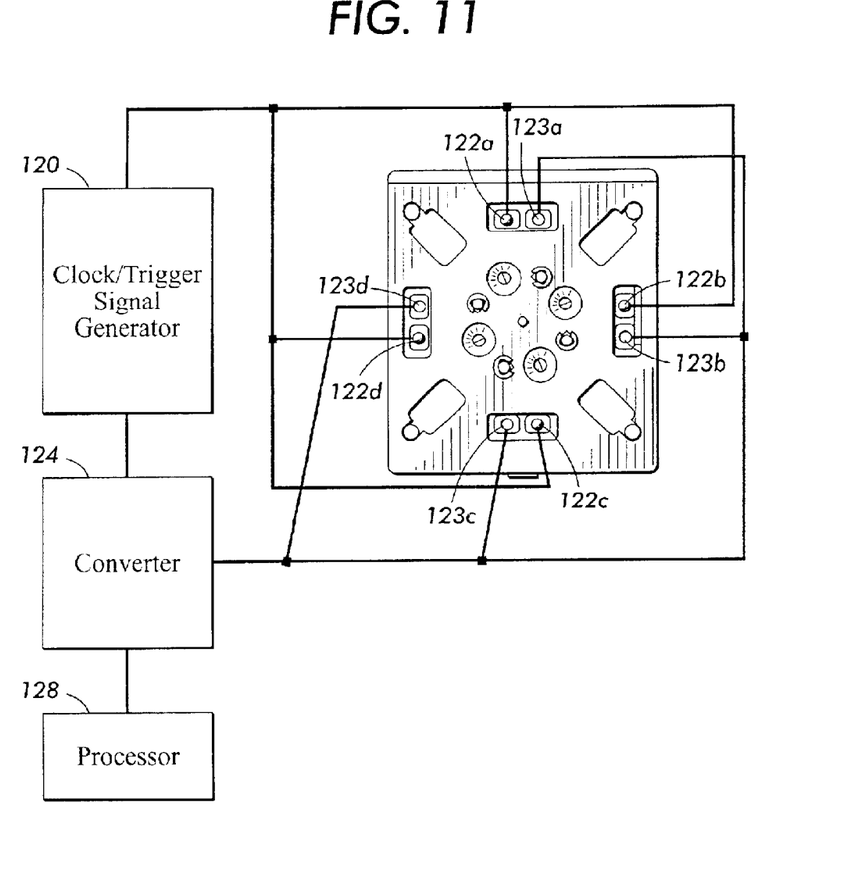
FIG. 11 sets forth a block diagram illustrating a system which may implement concepts of the present invention.

Turning to FIG. 11, illustrated is a block diagram of one potential implementation for the triggering of emitters, the reception of the emitter signals and the processing of the received data signals in accordance with the present invention. Particularly, trigger signal generator/clock 120 is in operational connection with emitters 122a–122d of emitter/receiver pairs 122a–122d, 123a–123d, and generates emitter control signals for activating the emitters 122a–122d of the face plate. These signals would be received by receivers on another similarity arranged (not shown faceplate). In the same manner the other face plate (not shown) will emit signals which are received by receivers 123a–123d. A converter 124 in operational connection with receivers 123a–123d obtain the analog signals and converts the signals into a digital form. The converter then provides the digital data to a processing system 128 for generation of offset instructions. It is to be appreciated, while the face plate implementing emitter/receiver pairs is shown (FIG. 8), the described system may also be implemented for use with the face plate embodiment of FIG. 3 as well as other arrangements. Also, while FIG. 11 shows the system with wire connections, it is to be understood that the present applications are also capable of being formed in other arrangements such as wireless formats.

Typically, each module has one microprocessor (such as a Motorola MPC555 Power PC), where the IR data is converted. If data from both sides is required, data from one side may send this data to the other module, or both modules may send data to a master module, where computations take place. In processor a TPU3 (time processing unit) generates the trigger and emitter control signals. The trigger signal is fed back into a QADC64 (queued analog to digital converter) external trigger input line to obtain the readings from the IR detectors. A list of conversions is initially programmed into the analog digital queue and a single interrupt is generated at the end of each complete period. The interrupt service routine is responsible for subtracting the ambient measurements and sending the data to a master computation thread. The microprocessor may send this data over a CANbus network to a master, which may also be an MPC555 micro-controller, wherein an algorithm for finding the six degree of freedom position offset is implemented.

10. Conclusion

In the foregoing discussion, it is to be appreciated that the disclosed embodiments provide a symmetry between face plates. This symmetry is desirable to permit alignment and/or docking between the modules. Thus, these modules are not only able to align or link-up but they are capable of accomplishing this even if the modules have been rotated with respect to each other.

The disclosed concepts provide a low cost six degree of freedom offset sensing capability between two components such as the described modules. However, it is to be understood that components and modules should be construed in their broadest sense to mean any elements which are to be aligned. Further, while the discussion focussed on use in connection with modular, self-configurable robots, other environments may also take advantage of the low-cost measurement and actuation concepts of embodiments of the present invention, enabling applications beyond robotic docking. Such systems may include, for example, use with digital cable TV set-top box navigation, which is presently done with arrow buttons to move the highlighted selection on the screen. Implementing this concept, one could use a remote control as a pointer. The set-top box would measure the relative position of the remote control in the same manner as a mouse on a computer system is presently used today. In this use, one embodiment would place four emitters on the handheld pointer and four receivers on the TV box. Such a system may be represented by FIG. 11 to illustrate the handheld pointer, where the receivers are removed. Similarly, FIG. 11 may represent a portion of the TV box where the four emitters are removed and four receivers are positioned to receive the transmitter signals.

Other implementations may include cars that park themselves, toys, jacks on the back of the computer or stereo that move into position as they are being plugged in, a gas nozzle that finds a car's tank opening, or robot appliance that automatically dock or recharge, fluid or supply interfaces in the home, office or business, among other uses.

The foregoing is considered as only illustrative of the principles of the invention. Further, since numerous modifications and changes will readily occur to those skilled in the art, it is not desired to limit the invention to the exact construction operation as shown and described, and accordingly all suitable modifications and equivalents may be considered as falling within the scope of the invention.

What is claimed is:

1. An alignment system comprising:
   a first module;
   a first plurality of emitters located at defined locations on a face of the first module, positioned to emit signals of a known intensity distribution away from the face of the first module;
   a first receiver configuration located on the face of the first module, having a known sensitivity distribution;
   a second module;
   a second plurality of emitters located at defined locations on a face of the second module, positioned to emit signals of a known intensity distribution away from the face of the second module;
   a second receiver configuration located on the face of the second module, having a known sensitivity distribution;
   a trigger signal generator configured to fire the first plurality of emitters of the first module in a predetermined pattern to generate signals sensed by the second receiver configuration of the second module, and to fire the second plurality of emitters of the second module in a predetermined pattern to generate signals sensed by the first receiver configuration of the first module;
   a converter configuration arranged to obtain and convert the signals received by the first and second receiver configurations into data representative of the signals sensed by the receiver configurations; and
   a processing system configured to receive the data from the converter configuration, and to compute an offset between the faces of the first and second modules.

2. The system according to claim 1 wherein the offset is a six degree offset between the first module and the second module.

3. The system according to claim 1 wherein the computed offset is at least one of an absolute offset or a relative offset.

4. The system according to claim 1 wherein the first and second modules have at least six degrees of movement in the x, y, z, pitch, roll and yaw directions.

5. The system according to claim 1 wherein the offset information is used to align the first module and the second module.

6. The system according to claim 1 wherein the face of the first module further includes the plurality of first emitters being located at edges of the face, the first receiver configuration including first and second receivers located at approximately the mid-line and center of the face, and wherein the face of the second module further includes having the plurality of second emitters being located at corners of the four sided face, the second receiver configuration including first and second receivers located at approximately the mid-line and center of the face.

7. The system according to claim 6 wherein the plurality of first emitters are four emitters located at edges of the face, and the plurality of second emitters are four emitters located at edges of the face.

8. The system according to claim 1 wherein the face of the first module further includes having the first plurality of emitters and the first receiver configuration on the face of the first module consisting of emitter/receiver combinations at predetermined locations, and wherein the face of the second module further includes having the second plurality of emitters and the second receiver configuration on the face of the second module consisting of emitter/receiver combinations at predetermined locations.

9. The system according to claim 8 wherein the emitter/receiver pairs of the first module face and the emitter/receiver pairs of the second module face are configured wherein movement of the face plate of the first module toward the face plate of the second module results in a change in intensities of emitter signals received by the receivers of the first and second face plates.

10. The system according to claim 9 wherein the locations of the emitter/receiver pairs of the first and second face plates have a symmetry which permits alignment between the first and second modules when the modules are rotated with respect to each other.

11. The system according to claim 1 wherein the face of the first module and the face of the second module are configured to have a change in intensities of emitter signals as the modules move toward each other.

12. The system according to claim 1 wherein the first module and the second module are modules of a modular reconfigurable robotic system.

13. The system according to claim 1 wherein the first and second pluralities of emitters are commercial-off-the-shelf (COTS) infrared (IR) light emitting diodes, and the first and second receiver configurations are commercial-off-the-shelf (COTS) infrared receivers.

14. The system according to claim 1 wherein the first receiver configuration and the second receiver configuration detects ambient signals.

15. The system according to claim 1 wherein the processing system computes six degree offset through at least one of absolute position sensing and relative offset sensing.

16. An alignment method comprising:
    configuring a first face of a first module to have a first plurality of emitters of a known intensity distribution, and a first receiver configuration having a known sensitivity distribution;
    configuring a second face of a second module to have a second plurality of emitters of a known intensity distribution, and a second receiver configuration having a known sensitivity distribution;
    activating the first plurality of emitters;
    detecting by the second receiver configuration a first set of signals from the first set of emitters;
    activating the second plurality of emitters;
    detecting by the first receiver configuration a second set of signals from the second set of emitters;
    converting the first set of signals received by the first receiver configuration and the second set of signals received by the second receiver configuration, to digital data representative of the first and second sets of signals; and
    processing the digital data to compute an offset between the face of the first module and the face of the second module.

17. The method according to claim 16 wherein the offset is a six degree offset between the first module and the second module.

18. The method according to claim 16 wherein movement of the first face plate toward the second face plate results in a change in intensities of emitter signals received by the receivers.

19. The system according to claim 16 wherein the first and second modules have at least six degree freedom of movement.

20. The system according to claim 16 wherein the locations of the emitter/receiver pairs of the first and second face plates have a symmetry which permits alignment between the first and second modules when the modules are rotated with respect to each other.

* * * * *